(12) United States Patent
Shin et al.

(10) Patent No.: US 10,004,049 B2
(45) Date of Patent: Jun. 19, 2018

(54) CONTROLLER FOR MANAGING BASE STATION IN HETEROGENEOUS NETWORK ENVIRONMENT AND MANAGING METHOD OF THE CONTROLLER, AND BASE STATION MANAGING SYSTEM

(71) Applicant: ELECTRONICS AND TELECOMMUNICATIONS RESEARCH INSTITUTE, Daejeon (KR)

(72) Inventors: Yeon Seung Shin, Daejeon (KR); Eung Bae Kim, Daejeon (KR); Jee Hyeon Na, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 15/093,059

(22) Filed: Apr. 7, 2016

(65) Prior Publication Data
US 2016/0309428 A1  Oct. 20, 2016

(30) Foreign Application Priority Data
Apr. 16, 2015  (KR) .................. 10-2015-0053561

(51) Int. Cl.
*G08C 17/00* (2006.01)
*H04W 52/38* (2009.01)
(Continued)

(52) U.S. Cl.
CPC ..... *H04W 52/386* (2013.01); *H04W 52/0206* (2013.01); *H04W 24/02* (2013.01);
(Continued)

(58) Field of Classification Search
CPC .......... H04W 52/386; H04W 52/0206; H04W 24/02; H04W 84/045; H04W 88/12
See application file for complete search history.

(56) References Cited

U.S. PATENT DOCUMENTS 9,253,734 B2 *  2/2016  Chen ................... H04W 52/241
9,807,652 B2 * 10/2017  Grech ............... H04W 36/0072
(Continued)

FOREIGN PATENT DOCUMENTS

| EP | 2 466972 | * | 6/2012 |
| EP | 2 787776 | * | 10/2014 |
| KR | 10-2013-0000116 A | | 1/2013 |

OTHER PUBLICATIONS

Sunwook Kim, "Status of Energy Conservation Technologies through On-Off Switching of Base Station", *The Korean Institute of Communications and information Sciences* vol. 31, No. 7, Jun. 2014, pp. 66-69 (11 Pages in Koran with English Abstract).

*Primary Examiner* — Robert Wilson
(74) *Attorney, Agent, or Firm* — NSIP Law (57) ABSTRACT

Disclosed is a controller managing a base station in a heterogeneous network environment constituted by a macro base station and a small cell base station group, including: a traffic managing unit managing traffic of the small cell base station group; and an operation controlling unit controlling an operation of at least one peripheral base station included in the small cell base station group based on the traffic of the small cell base station group, wherein the small cell base station group includes a center base station and the at least one peripheral base station and the small cell base station group is disposed in a macro cell configured by the macro base station.

13 Claims, 8 Drawing Sheets

(51) Int. Cl.
*H04W 52/02* (2009.01)
*H04W 84/04* (2009.01)
*H04W 88/12* (2009.01)
*H04W 24/02* (2009.01)

(52) U.S. Cl.
CPC .......... *H04W 84/045* (2013.01); *H04W 88/12* (2013.01); *Y02D 70/00* (2018.01)

(56) References Cited

U.S. PATENT DOCUMENTS

| | | |
|---|---|---|
| 2008/0175180 A1 | 7/2008 | Kim |
| 2010/0113049 A1* | 5/2010 | Lee ................ H04W 48/12 455/450 |
| 2011/0105200 A1* | 5/2011 | Tomita ............ H04W 52/0241 455/574 |
| 2011/0223913 A1* | 9/2011 | Kho ................ H04W 52/0206 455/435.1 |
| 2011/0244792 A1* | 10/2011 | Park ................ H04W 52/0216 455/39 |
| 2011/0287756 A1* | 11/2011 | Cho ................ H04W 52/0229 455/418 |
| 2012/0094654 A1 | 4/2012 | Kim et al. |
| 2012/0099455 A1* | 4/2012 | Morita ................ H04W 16/10 370/252 |
| 2012/0157131 A1* | 6/2012 | Chang ................ H04W 68/00 455/458 |
| 2013/0072206 A1* | 3/2013 | Lim .................... H04W 76/022 455/450 |
| 2013/0150042 A1* | 6/2013 | Oh .................... H04W 36/0061 455/436 |
| 2014/0051419 A1* | 2/2014 | Brend .............. H04W 52/0206 455/418 |
| 2014/0146728 A1* | 5/2014 | Cha .................. H04W 52/0206 370/311 |
| 2016/0205623 A1* | 7/2016 | Uchiyama ......... H04W 52/0206 370/311 |
| 2016/0309428 A1* | 10/2016 | Shin ................. H04W 52/386 |
| 2017/0013468 A1* | 1/2017 | Zhu ........................ H04L 41/12 |

* cited by examiner

| | TRAFFIC LOAD [3 MINUTES] OF CELL BASE STATION GROUP | | | | | | AVERAGE TRAFFIC LOAD [FOR 3 MINUTES] | WHETHER TRAFFIC INCREASES OR DECREASES [INCREASE: 1, DECREASE: 0] |
|---|---|---|---|---|---|---|---|---|
| | 1st MEASURED LOAD | 2nd MEASURED LOAD | | 4th MEASURED LOAD | 5th MEASURED LOAD | 6th MEASURED LOAD | | |
| GROUP B | | | | | | | | |
| GROUP C | | | | | | | | |
| GROUP D | | | | | | | | |

| | CENTER BASE STATION | FIRST REFERENCE VALUE | SECOND REFERENCE VALUE | PERIPHERAL BASE STATION |
|---|---|---|---|---|
| MACRO CELL A0 | A0 | 40 | 60 | |
| MACRO CELL A1 | A1 | 40 | 60 | |
| SMALL CELL GROUP B | B0 | 40 | 60 | B1,B2,B3,B4,B5,B6 |
| SMALL CELL GROUP C | C0 | 40 | 60 | C1,C2,C3,C4,C5,C6 |
| SMALL CELL GROUP D | D0 | 40 | 60 | D1,D2,D3,D4,D5,D6 |

CONTROLLER FOR MANAGING BASE STATION IN HETEROGENEOUS NETWORK ENVIRONMENT AND MANAGING METHOD OF THE CONTROLLER, AND BASE STATION MANAGING SYSTEM

CROSS-REFERENCE TO RELATED APPLICATIONS

This application claims priority to and the benefit of Korean Patent Application No. 10-2015-0053561 filed in the Korean Intellectual Property Office on Apr. 16, 2015, the entire contents of which are incorporated herein by reference.

TECHNICAL FIELD

The present invention relates to a controller for managing a base station in a heterogeneous network environment and a managing method of the controller, and a base station managing system.

BACKGROUND ART

In general, a mobile communication system establishes and operates a system that can provide performance required at a peak time when usage becomes maximum. However, since the mobile communication system wastes energy while using 50% or less of the performance at an off-peak time, energy saving is required for reducing system maintenance cost.

To this end, an energy saving technology of a general mobile communication system saves the energy through a method for minimizing energy used in devices (e.g., a CPU, a fan, and the like) constituting the system and a method for extending coverage of a base station selected at the off-peak time and switching off peripheral base stations through controlling the mobile communication system.

However, the technologies have a problem in that the technologies cannot actively cope with the energy saving and a sudden traffic increase in a heterogeneous network environment in which a lot of small cells are high densely overlapped and installed in a macro cell in order to process heavy mobile traffic.

SUMMARY OF THE INVENTION

The present invention has been made in an effort to provide a controller for managing a base station and a managing method of the controller, and a base station managing system which can save energy consumption of the base station in a heterogeneous network environment.

The technical objects of the present invention are not limited to the aforementioned objects, and other technical objects, which are not mentioned above, will be apparently appreciated to a person having ordinary skill in the art from the following description.

An exemplary embodiment of the present invention provides a controller managing a base station in a heterogeneous network environment constituted by a macro base station and a small cell base station group, including: a traffic managing unit managing traffic of the small cell base station group; and an operation controlling unit controlling an operation of a peripheral base station included in the small cell base station group based on the traffic of the small cell base station group, wherein the small cell base station group includes a center base station and the at least one peripheral base station and the small cell base station group is disposed in a macro cell configured by the macro base station.

The operation controlling unit may deactivate the peripheral base station when the traffic of the small cell base station group decreases with time and the traffic is smaller than a first reference value.

The operation controlling unit may control coverage of the center base station to include coverage of the deactivated peripheral base station.

The operation controlling unit may extend the coverage of the center base station as large as coverage of the small cell base station group.

The operation controlling unit may activate the at least one peripheral base station when the traffic of the small cell base station group increases with time and the traffic is equal to or larger than a second reference value.

The traffic managing unit may manage whether the traffic increases or decreases by measuring the traffic of the small cell base station group at a unit time interval.

Another exemplary embodiment of the present invention provides a managing method of a base station in a heterogeneous network environment constituted by a macro base station and a small cell base station group, including: measuring traffic of the small cell base station group; and controlling an operation of a peripheral base station included in the small cell base station group based on the traffic of the small cell base station group, wherein the small cell base station group includes a center base station and the peripheral base station and the small cell base station group is disposed in a macro cell configured by the macro base station.

The controlling of the operation of the peripheral base station included in the small cell base station group based on the traffic of the small cell base station group may include extending coverage of the center base station as large as coverage of the small cell base station group when the traffic of the small cell base station group decreases with time and the traffic is smaller than a first reference value; and deactivating the peripheral base station.

The controlling of the operation of the peripheral base station included in the small cell base station group based on the traffic of the small cell base station group may include activating the peripheral base station when the traffic of the small cell base station group increases with time and the traffic is equal to or larger than a second reference value; and restoring the coverage of the center base station.

Yet another exemplary embodiment of the present invention provides a base station managing system including: a macro base station constituting a macro cell a small cell base station group disposed in coverage of the macro cell and including a center base station and a peripheral base station; and a controller managing traffic of the small cell base station group and controlling an operation of the peripheral base station based on the traffic of the small cell base station group.

The controller may start deactivating peripheral base stations of the small cell base station group when the traffic of the small cell base station group decreases with time and the traffic is smaller than a first reference value of the small cell base station group.

The controller may control coverage of the center base station to include coverage of the deactivated peripheral base stations.

The controller may extend the coverage of the center base station as large as coverage of the small cell base station group.

The controller may activate all of the peripheral base stations of the small cell base station group when the traffic of the small cell base station group increases with time and the traffic is equal to or larger than a second reference value.

The controller may verify the number of terminals accessing the activated peripheral base station of the small cell and deactivate a peripheral base station which no terminal accesses.

The controller may decide a small cell base station group for managing an area where massive traffic occurs when the traffic of the macro base station increases with time and the traffic of the macro base station is equal to or larger than the second reference value and activate peripheral base stations of the decided small cell base station group.

The controller may manage whether the traffic increases or decreases by measuring the traffic of the small cell base station group at a unit time interval.

The macro base station and the center base station may maintain an activation state.

Terminals accessing the macro base station may periodically transmit to the controller reference signal information received from the peripheral base stations and a traffic managing unit of the controller may decide a small cell group capable of managing a position where the traffic increases based on the received reference signal and a traffic state for each small cell group.

The macro base station and the small cell base station group may be connected with the controller by using an optical cable.

According to exemplary embodiments of the present invention, a controller for managing a base station in a heterogeneous network environment and a managing method of the controller, and a base station managing system reduce energy consumption by activating or deactivating a peripheral base station of a small cell according to a traffic change to reduce maintenance cost of a mobile communication system.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a 'terminal' may be referred to as a mobile station (MS user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various exemplary embodiments of the terminal may include a cellular phone, a smart phone having a wireless communication function, a personal digital assistant (PDA) having the wireless communication function, a wireless modem, a portable computer having the wireless communication function, a photographing device such as a digital camera having the wireless communication function, a gaming device having the wireless communication function, music storing and playing home appliances having the wireless communication function, Internet home appliances in which wireless Internet access and browsing are available and portable units or terminals having integrated combinations of the functions, but are not limited thereto.

Hereinafter, a 'base station' may generally represent a fixed or movable point which communicates with the terminal and may be a term generally designated as a base station, a node-B, an eNode-B, a base transceiver system (BTS), an access point, a relay, and the like.

Figure 1:
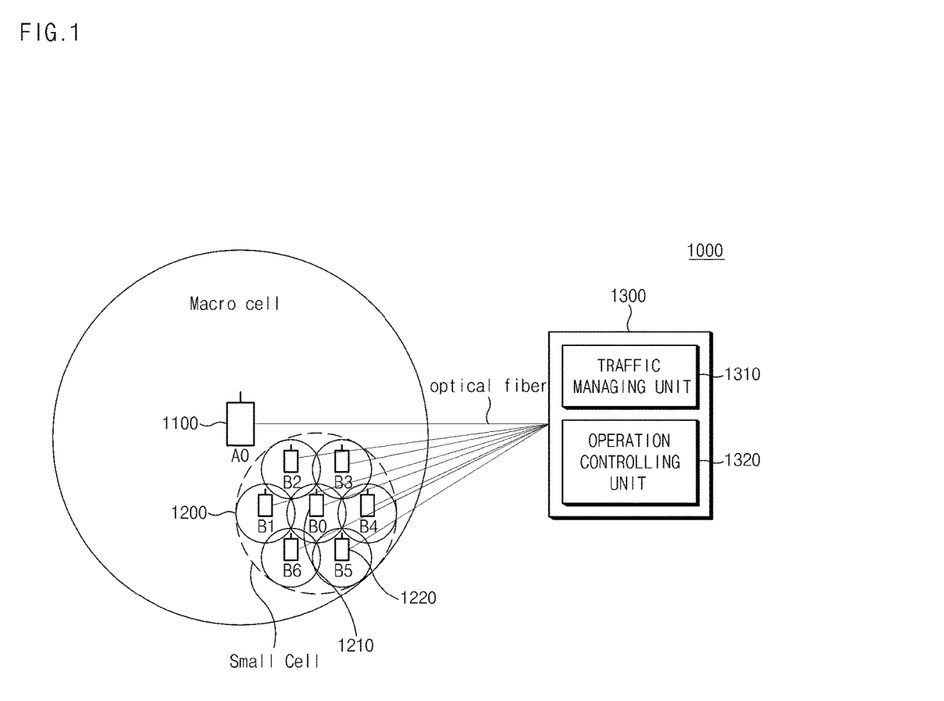
FIG. 1 illustrates a base station managing system in a heterogeneous network environment according to an exemplary embodiment of the present invention.

FIG. 1 illustrates a base station managing system in a heterogeneous network environment according to an exemplary embodiment of the present invention.

Referring to FIG. 1, a macro cell base station A0, 1100 may configure a macro cell. The macro cell base station 1100 may form and manage macro cell coverage. Herein, the coverage may mean a range in which a terminal is communicatable with a base station. For example, the macro cell base station A0, 1100 may be continuously controlled in an activation state. Herein, the activation state may mean a state in which the base station is switched on. The macro cell base station A0, 1100 may be connected with a controller 1300 through an optical cable.

A small cell base station group 1200 may be disposed in the macro cell. In FIG. 1, one small cell base station group 1200 is illustrated, but the number of small cell base station groups is not limited thereto and a plurality of small cell base station groups 1200 may be provided.

The small cell base station group 1200 may include a center base station B0, 1210 and at least one peripheral base station B1 to B6, 1220. For example, the center base station B0, 1210 may mean a base station positioned at the center of cell coverage of the small cell base station group 1200 and the peripheral base station B1 to B6, 1220 may mean a base station positioned around the center base station B0, 1210. Each of the center base station B0, 1210 and the peripheral base stations B1 to B6, 1220 may form the coverage. The coverage of the center base station B0, 1210 and the coverage of the peripheral base stations B1 to B6, 1220 may overlap with each other.

Operations of the center base station B0, 1210 and the peripheral base stations B1 to B6, 1220 may be managed by the controller 1300. For example, the center base station B0, 1210 is continuously managed in the activation state. The peripheral base stations B1 to B6, 1220 may be managed in the activation state or in a deactivation state according to a traffic situation. Herein, the deactivation state may mean a state in which the base station is switched off. Each of the center base station B0, 1210 and the peripheral base stations B1 to B6, 1220 may be connected with the controller 1300 through the optical cable.

As described above, the macro cell base station 1100 and the small cell base station group 1200 may constitute the heterogeneous network environment and a terminal (not illustrated) positioned in the macro cell coverage may communicate by selectively accessing the macro cell base station 1100, and the center base station B0, 1210 and/or the peripheral base stations B1 to B6, 1220 of the small cell base station group 1200 according to the position.

The controller 1300 may include a traffic managing unit 1310 and an operation controlling unit 1320. The traffic managing unit 1310 may manage traffic of the small cell base station group 1200. For example, the traffic managing unit 1310 measures the traffic of the small cell base station group 1200 at a unit time interval to manage whether the traffic increases or decreases.

The operation controlling unit 1320 may control the operations of the center base station and the peripheral base stations B0 to B6, 1200 included in the small cell base station group 1200. For example, the operation controlling unit 1320 may deactivate the peripheral base stations B1 to B6, 1200 when the traffic of the small cell base station group 1200 decreases with time and the traffic is smaller than a first reference value.

The operation controlling unit 1320 may control the coverage of the center base station B0, 1210 to include the cell coverage of the deactivated peripheral base stations B1 to B6, 1220. For example, the operation controlling unit 1320 may extend the cell coverage of the center base station B0, 1200 as large as the cell coverage of the small cell base station group 1200.

For example, the operation controlling unit 1320 may activate the peripheral base stations B1 to B6, 1220 when the traffic of the small cell base station group 1200 increases with time and the traffic is equal to or larger than a second reference value. For example, the second reference value is larger than the first reference value.

As described above, the controller 1300 of a base station managing system 1000 according to the exemplary embodiment of the present invention may manage the traffic of the small cell base station group 1200 and control the operations of the peripheral base stations of the small cell base station group 1200 based on the traffic. Therefore, the energy consumption is reduced by activating or deactivating the base station according to the traffic change to reduce the maintenance cost of the mobile communication system.

Figure 2:
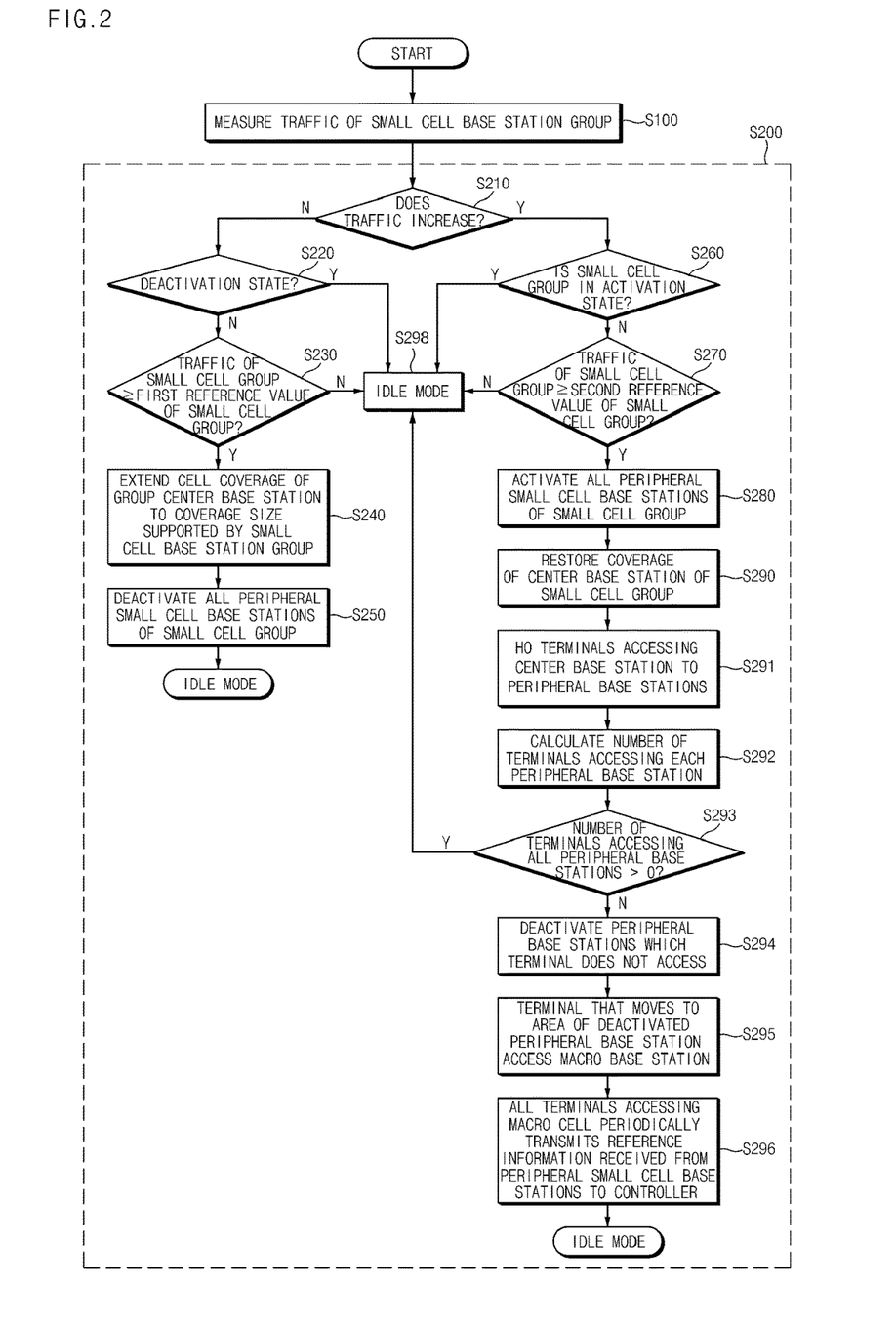
FIGS. 2 and 3 are flowcharts illustrating a managing method of a base station in a heterogeneous network environment according to an exemplary embodiment of the present invention.
Figure 3:
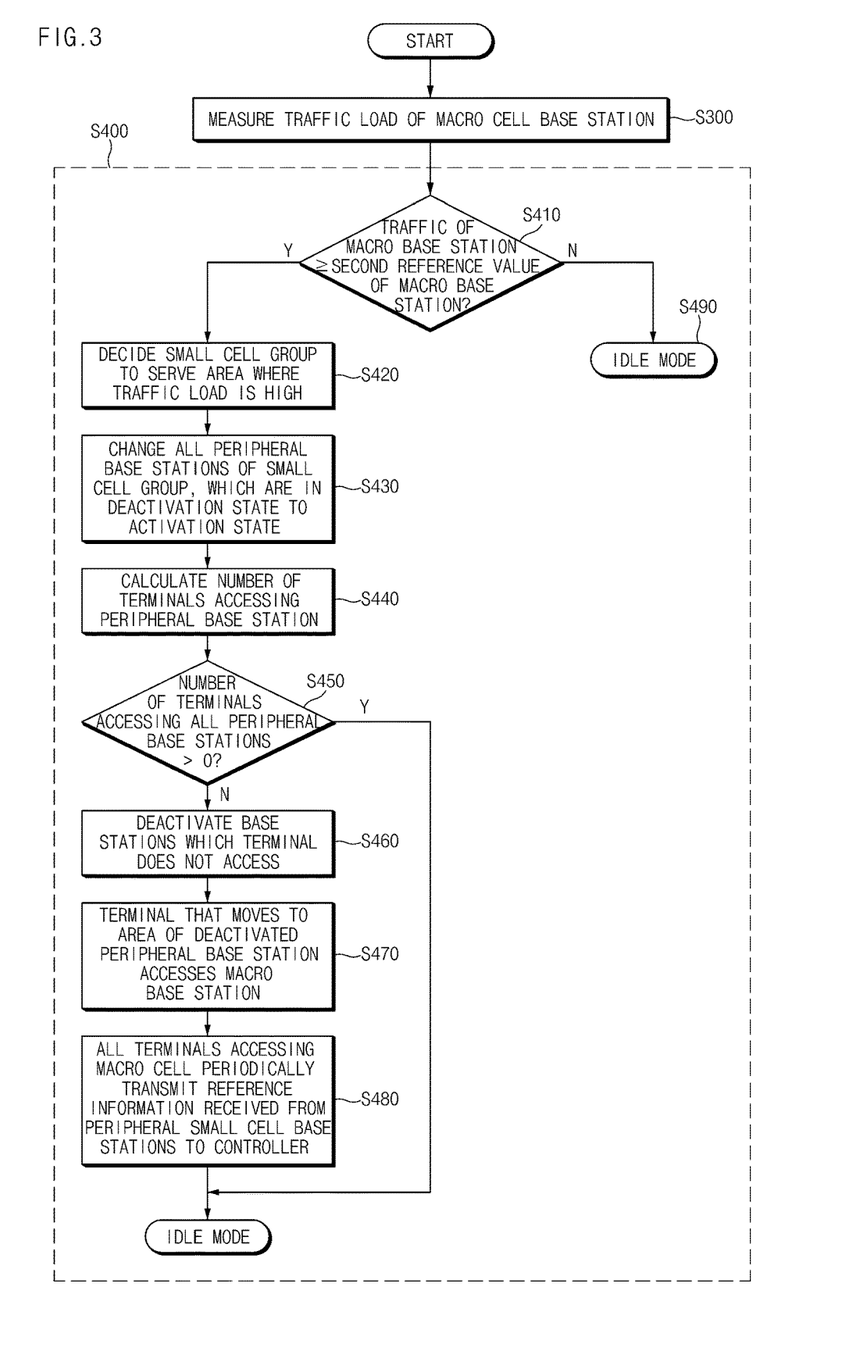
Figure 4:
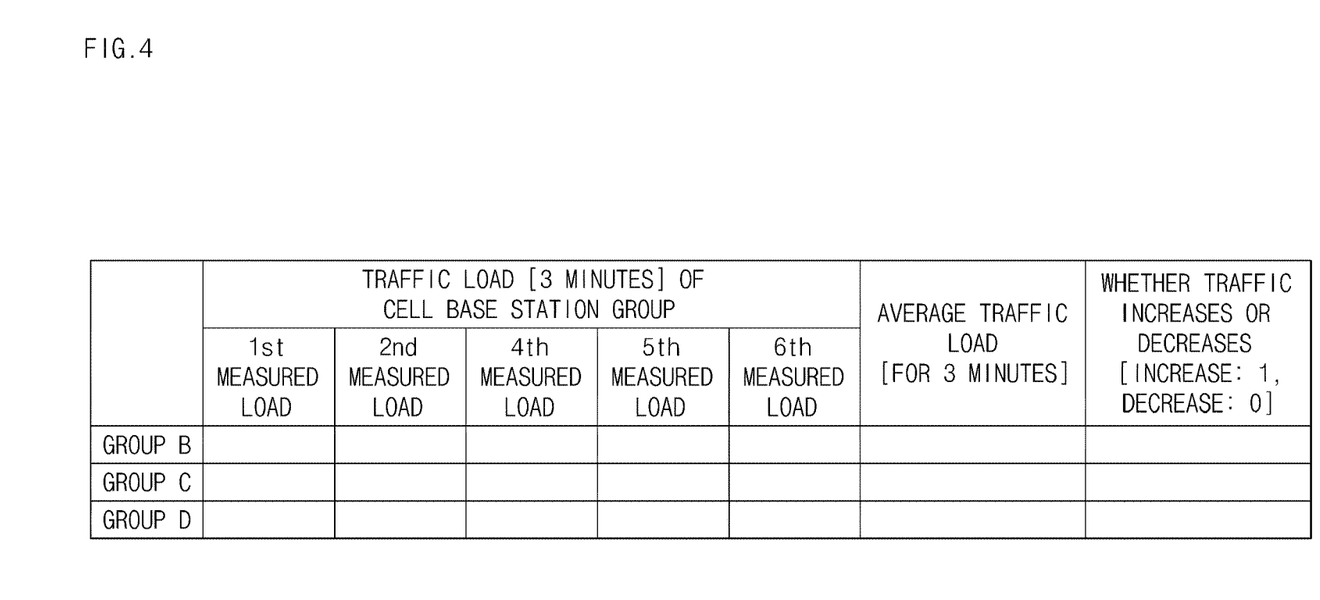
FIG. 4 is a diagram for describing a traffic managing operation according to an exemplary embodiment of the present invention.
Figure 5:
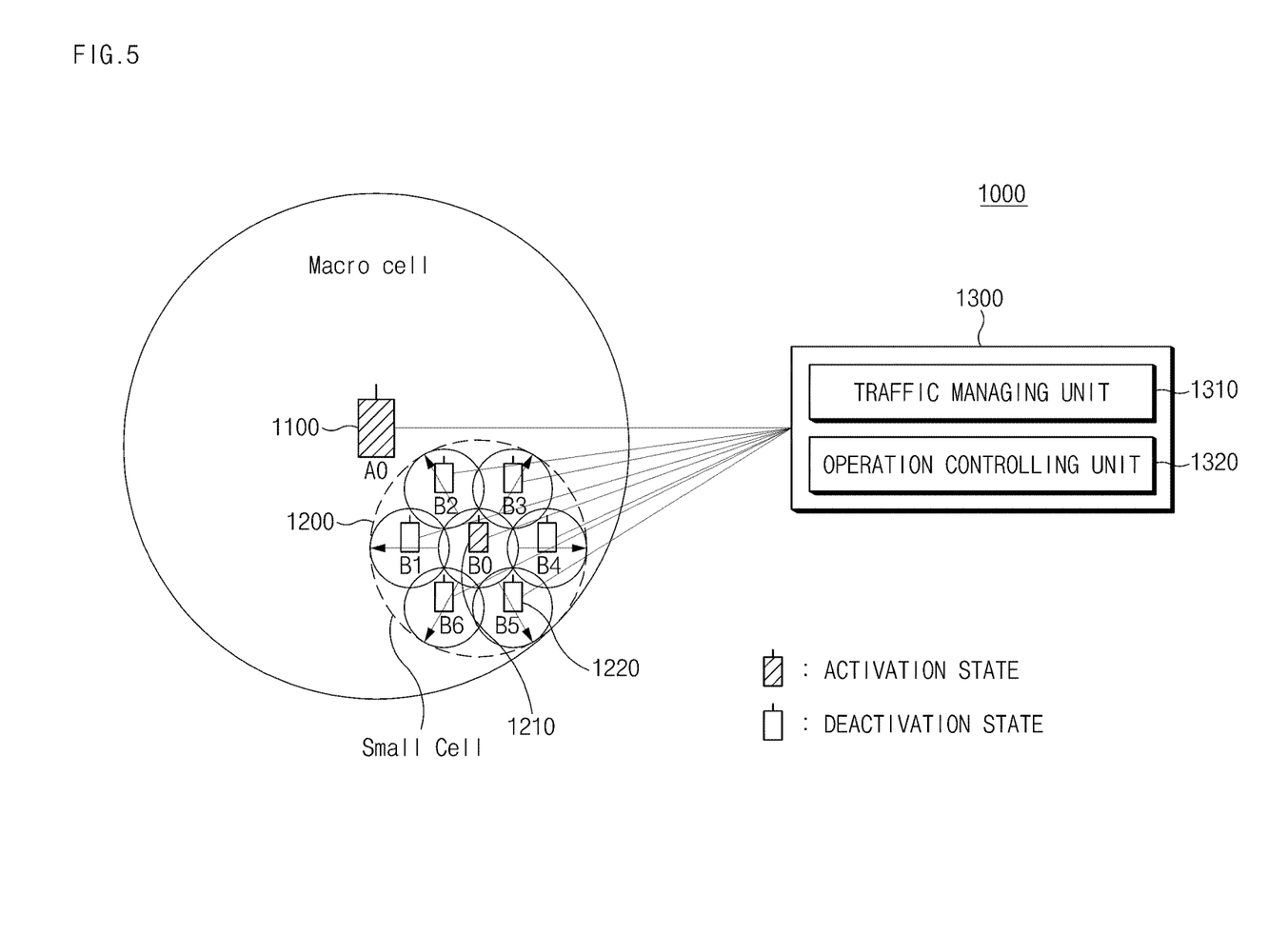
FIGS. 5 and 6 are diagrams for describing a base station controlling operation according to an exemplary embodiment of the present invention.
Figure 6:
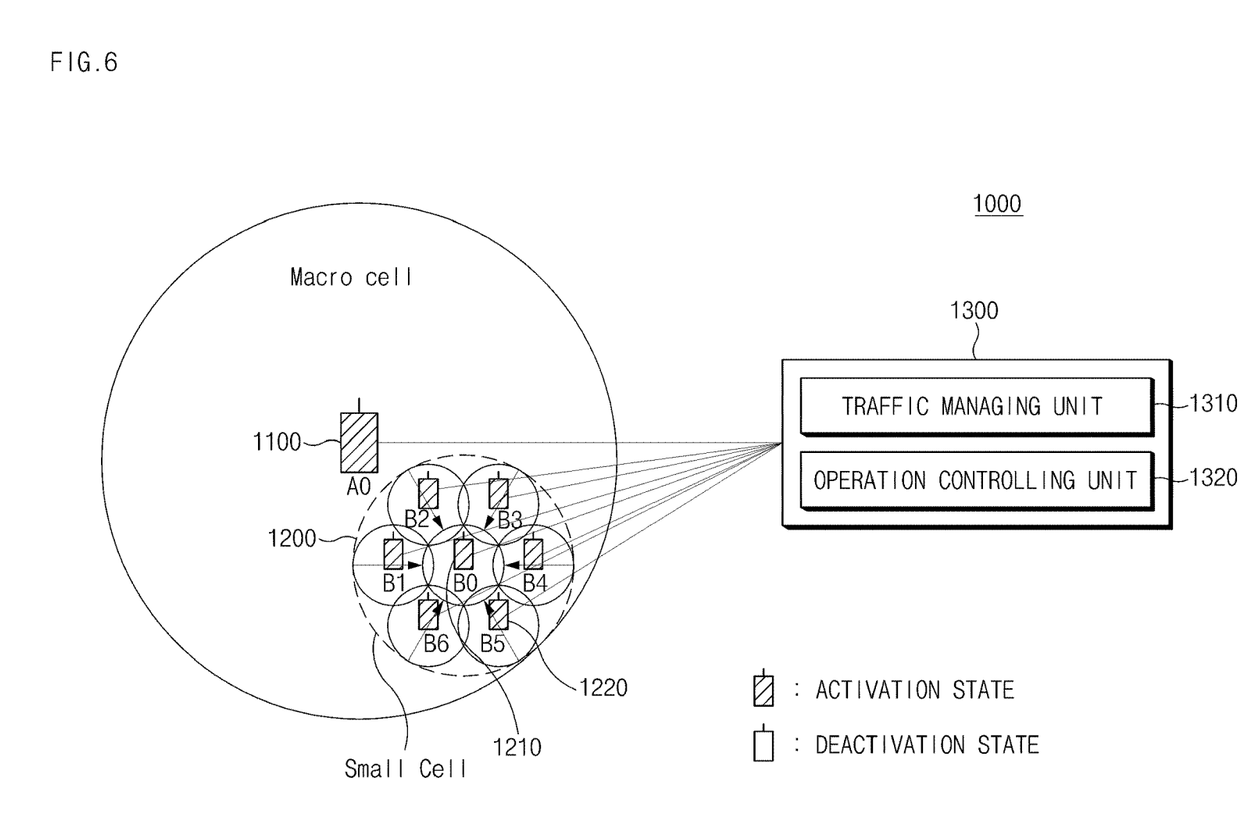

FIGS. 2 and 3 are flowcharts illustrating a managing method of a base station in a heterogeneous network environment according to an exemplary embodiment of the present invention. FIG. 4 is a diagram for describing a traffic managing operation according to an exemplary embodiment of the present invention. FIGS. 5 and 6 are diagrams for describing a base station controlling operation according to an exemplary embodiment of the present invention.

First, referring to FIG. 2, the managing method of the base station in the heterogeneous network environment according to the exemplary embodiment of the present invention may include measuring traffic of a small cell base station group (S100) and controlling operations of peripheral base stations included in a small cell base station based on the traffic of the small cell base station group (S200).

First, step S100 will be described. Referring to FIG. 4, the traffic managing unit 1310 (see FIG. 1) may measure traffic of the small cell base station group (e.g., B, C, and D groups) at a unit time interval (e.g., an interval of 3 minutes). The traffic managing unit 1310 may calculate an average traffic load by using the traffic measured at the unit time interval. In addition, the traffic managing unit 1310 may decide whether the traffic of the small cell base station group increases or decreases with time.

Referring back to FIG. 2, step S200 may include determining whether the traffic of the small cell base station group increases or decreases (S210), determining whether at least one peripheral base station of the small cell base station group is in a deactivation state when the traffic does not increase (S220), determining whether the traffic of the small cell base station group is smaller than a first reference value when at least one peripheral base station is in an activation state (S230), extending cell coverage of a center base station as large as coverage of the small cell base station group when the traffic of the small cell base station group is smaller than the first reference value (S240), and deactivating all of the peripheral base stations constituting the small cell base station group (S250).

Referring to FIG. 5, a case in which the traffic of the small cell base station group decreases is illustrated. The traffic managing unit 1310 (see FIG. 1) may manage the traffic of the small cell base station group 1200. The operation controlling unit 1320 may determine whether at least one peripheral base station B1 to B6, 1220 is in the deactivation state (S220) when the traffic of the small cell base station group 1200 decreases (S210). The operation controlling unit 1320 may determine whether the traffic of the small cell base station group 1200 is smaller than the first reference value when at least one peripheral base station B1 to B6, 1220 is in the activation state (S230).

The operation controlling unit 1320 may extend the cell coverage of the center base station B0, 1210 to the coverage of the small cell base station group 1200 when the traffic of the small cell base station group 1200 is smaller than the first reference value (S240). The operation controlling unit 1320 may deactivate all of the peripheral base stations B1 to B6, 1220 (S250). When the peripheral base stations B1 to B6, 1220 are deactivated, a terminal (not illustrated) that communicates with the peripheral base stations B1 to B6, 1220 may communicate by accessing the center base station B0, 1210 or the macro base station through handover.

That is, when the traffic of the small cell base station group 1200 decreases with time and the traffic is smaller than the first reference value, since the coverage of the small cell base station group 1200 may be sufficiently covered through the extension of the cell coverage of the center base station B0, 1210, it may be appreciated that the operation controlling unit 1320 may deactivate the peripheral base stations B1 to B6, 1220.

Referring back to FIG. 2, step S200 may include, as a result of the determination in step S210, determining whether the peripheral base stations of the small cell base station group are in the activation state when the traffic increases (S260), determining whether the traffic of the small cell base station group is equal to or larger than a second reference value when the peripheral base stations are in the deactivation state (S270), activating all of the peripheral base stations when the traffic of the small cell base station group is equal to or larger than the second reference value (S280), restoring the cell coverage of the center base station (S290), handing over (HO) terminals accessing the center base station to the activated peripheral base stations to access the peripheral base station (S291), calculating the number of terminals accessing the peripheral base station of the small cell group (S292), deactivating a peripheral base station which the terminal does not access (S293 and S294), accessing the macro base station or the peripheral small cell base station by a terminal that moves to service coverage of the deactivated peripheral base station (S295), and periodically transmitting reference signal information received from the peripheral small cell base stations to the controller by all terminals accessing the macro base station (S296).

Referring to FIG. 6, a case in which the traffic of the small cell base station group increases is illustrated. The traffic managing unit 1310 (see FIG. 1) may manage the traffic of the small cell base station group 1200. The operation controlling unit 1320 may determine whether at least one peripheral base station B1 to B6, 1220 is in the activation state (S260) when the traffic of the small cell base station group 1200 increases (S210). The operation controlling unit 1320 may determine whether the traffic of the small cell base station group 1200 is equal to or larger than the second reference value when at least one peripheral base station B1 to B6, 1220 is in the deactivation state (S270).

The operation controlling unit 1320 may activate all of the peripheral base stations B1 to B6, 1220 when the traffic of the small cell base station group 1200 is equal to or larger than the second reference value (S280). The operation controlling unit 1320 may restore (that is, to original cell coverage) the cell coverage of the center base station B0, 1210 (S290). When the peripheral base stations B1 to B6, 1220 are activated, a terminal (not illustrated) that communicates with the center base station B0, 1210 and/or the macro cell base station AO, 1100 may communicate with the activated peripheral base stations B1 to B6, 1220 through the handover.

The operation controlling unit 1320 may calculate the number of terminals accessing each peripheral base station of the small cell group (S292) and deactivate the base station when there is no terminal accessing each peripheral base station (S293 and S294). In this case, the terminal that moves to the coverage of the deactivated peripheral base station may communicate by accessing the macro base station or the peripheral small cell base station (S295). All terminals that access the macro base station periodically transmit reference signal information received from the peripheral small cell base stations to the controller 1300 (S296) to support decision of a small cell group to serve the terminals in the controller 1300.

Meanwhile, when at least one peripheral base station B1 to B6, 1220 is in the deactivation state as a result of the determination in step S220, the traffic of the small cell base station group 1200 is equal to or larger than the first reference value as a result of the determination in step S230, all of the peripheral base stations B1 to B6, 1220 are in the activation state as a result of the determination in step S260, or the traffic of the small cell base station group 1200 is smaller than the second reference value as a result of the determination in step S270, the operation controlling unit 1320 may operate in an idle mode (S300).

Referring to FIG. 3, the managing method of the base station in the heterogeneous network environment according to the exemplary embodiment of the present invention may include periodically measuring traffic of a macro base station group (S300) and controlling operations of peripheral base stations included in the small cell base station based on the traffic of the small cell base station group (S400).

First, step S300 will be described. The traffic managing unit 1310 may calculate the average traffic load by using the traffic of the macro base station measured at the unit time interval.

Step S400 may include verifying whether the traffic of the macro base station is larger than a second reference value of the macro base station (S410), deciding a small cell group managing an area where an occurrence probability of the traffic is high (S420), changing all of the peripheral base stations of the small cell base station group, which are in the deactivation state to the activation state (S430), calculating the number of terminals accessing the peripheral base station (S440), verifying the number of terminals accessing the peripheral base station (S450), deactivating a base station which the terminal does not access (S460), accessing the macro base station by a terminal that moves to coverage of the deactivated peripheral base station (S470), and periodically transmitting reference signal information received from the peripheral small cell base stations to the controller by all terminals accessing the macro base station (S480).

The terminal that accesses the macro base station periodically collects reference signals received from the center and peripheral base stations of the small cell group and transmits the collected reference signals to the operation controlling unit 1320 and the operation controlling unit 1320 periodically checks traffic for each small cell group to support deciding a position where massive traffic occur and a small cell group capable of receiving the corresponding traffic.

Meanwhile, as a result of the determination in step S410, when the traffic of the macro base station 1100 is smaller than the second reference value, the operation controlling unit 1320 may operate in the idle mode (S490).

Figure 7:
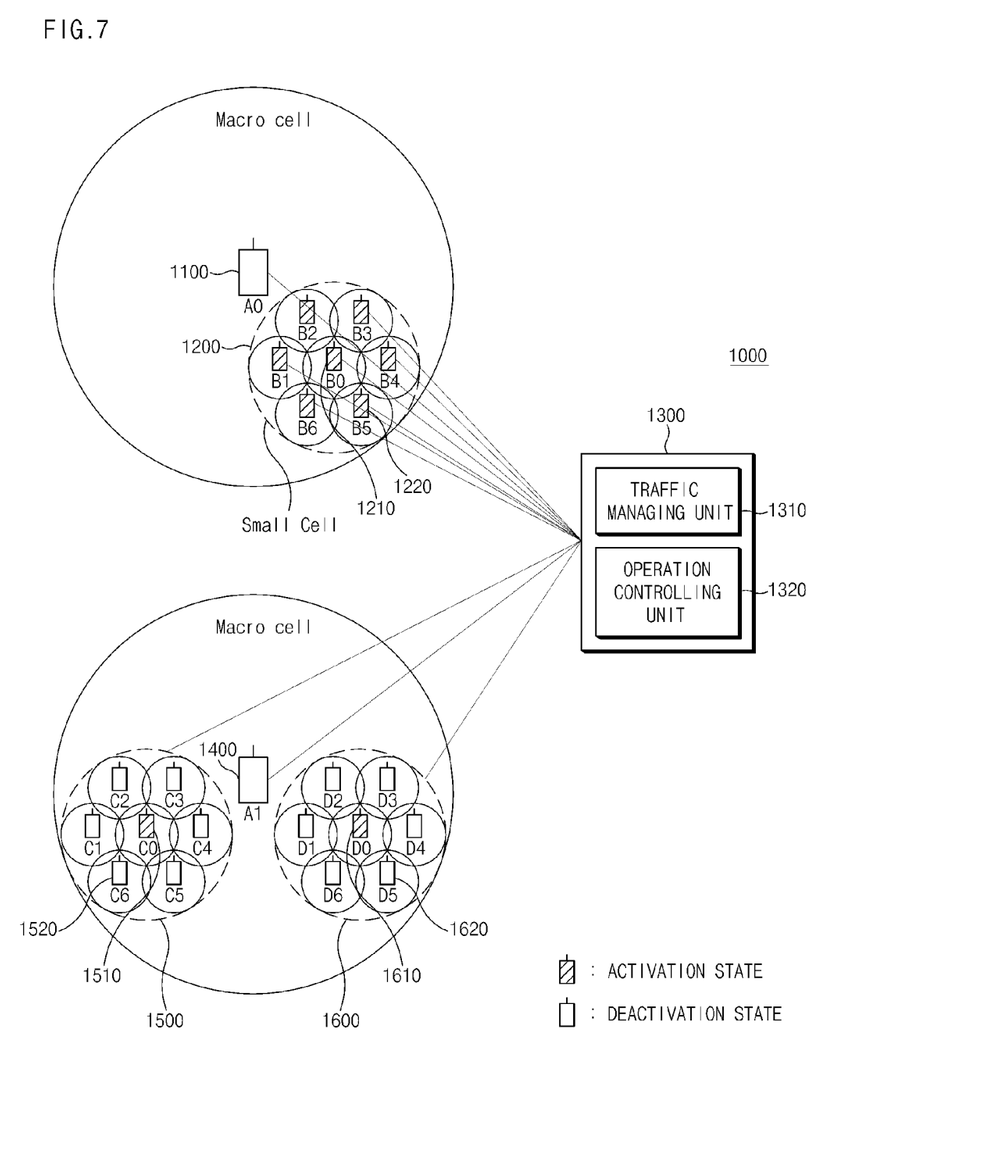
FIGS. 7 and 8 are diagrams for describing a base station controlling operation in a heterogeneous network environment according to another exemplary embodiment of the present invention.
Figure 8:
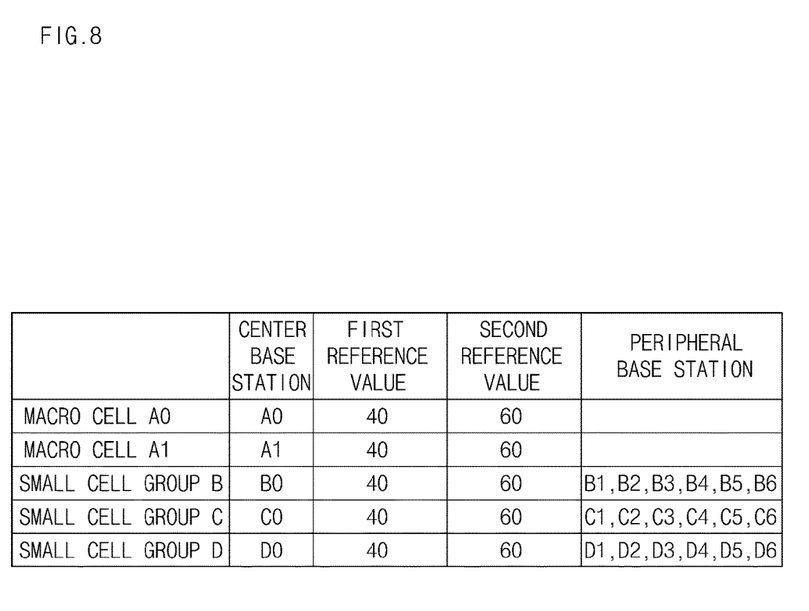

FIGS. 7 and 8 are diagrams for describing a base station controlling operation in a heterogeneous network environment according to another exemplary embodiment of the present invention.

Contents which are the same as contents described with reference to FIGS. 1 and 2 may be omitted in order to avoid duplication.

Referring to FIGS. 7 and 8, a heterogeneous network environment including a plurality of macro cell base stations A0 and A1 and a plurality of small cell base station groups 1200, 1500, and 1600 is illustrated in FIG. 7. The small cell base station group 1200 may include a center base station B0, 1210 and at least one peripheral base station B1 to B6, 1220. The small cell base station group 1500 may include a center base station C0, 1510 and at least one peripheral base station C1 to C6, 1520. The small cell base station group 1600 may include a center base station D0, 1610 and at least one peripheral base station D1 to D6, 1620. For example, a first reference value and a second reference value may be set to 40% and 60%, respectively.

The traffic managing unit 1310 may manage traffic of the small cell base station groups 1200 1500, and 1600.

The operation controlling unit 1320 may determine whether the peripheral base stations C1 to C6 and D1 to D6 are in the deactivation state when the traffic of the small cell base station groups 1500 and 1600 decreases. The operation controlling unit 1320 may determine whether the traffic of each of the small cell base station groups 1500 and 1600 is smaller than the first reference value when the peripheral base stations C1 to C6 and D1 to D6 are in the activation state.

The operation controlling unit 1320 may extend cell coverage of the center base stations C0 and D0 to the coverage of the small cell base station groups 1500 and 1600 when the traffic of each of the small cell base station groups 1500 and 1600 is smaller than the first reference value (S240). In addition, the operation controlling unit 1320 may deactivate the peripheral base stations C1 to C6 and D1 to D6.

The above description just illustrates the technical spirit of the present invention and various modifications and transformations can be made by those skilled in the art without departing from an essential characteristic of the present invention.

Accordingly, the various exemplary embodiments disclosed herein are intended to not limit but describe the technical spirit of the present invention but the scope of the technical spirit is not limited by the exemplary embodiments. The scope of the present invention should be interpreted by the appended claims and all technical spirit in the equivalent range thereto should be interpreted to be embraced by the claims of the present invention.

What is claimed is:

1. A controller to manage a base station in a heterogeneous network environment constituted by a macro base station and a small cell base station group, the controller comprising:
  a non-transitory memory storing instructions; and
  a processor configured to execute the instructions to manage traffic of the small cell base station group, and control an operation of a peripheral base station included in the small cell base station group based on the traffic of the small cell base station group,
  wherein the small cell base station group comprises a center base station and the peripheral base station, and the small cell base station group is disposed in a macro cell configured by the macro base station, and
  wherein the processor is further configured to execute the instructions to extend coverage of the center base station to be as large as coverage of the small cell base station group, in response to the traffic decreasing with time and the traffic being less than a first reference value, and to deactivate the peripheral base station.

2. The controller of claim 1, wherein the processor is further configured to activate the peripheral base station, in response to the traffic increasing with time and the traffic being greater than or equal to a second reference value.

3. The controller of claim 1, wherein the processor is further configured to manage whether the traffic increases or decreases by measuring the traffic at a unit time interval.

4. A method to manage a base station in a heterogeneous network environment constituted by a macro base station and a small cell base station group, the method comprising:
  measuring, by a processor, traffic of the small cell base station group; and
  controlling, by the processor, an operation of a peripheral base station included in the small cell base station group based on the traffic of the small cell base station group,
  wherein the small cell base station group comprises a center base station and the peripheral base station, and the small cell base station group is disposed in a macro cell configured by the macro base station, and
  wherein the controlling comprises extending coverage of the center base station to be as large as coverage of the small cell base station group, in response to the traffic decreasing with time and the traffic being less than a first reference value, and deactivating the peripheral base station.

5. The method of claim 4, wherein the controlling further comprises
  activating the peripheral base station, in response to the traffic increasing with time and the traffic being greater than or equal to a second reference value, and
  restoring the coverage of the center base station.

6. A base station managing system, comprising:
  a macro base station constituting a macro cell;
  a small cell base station group disposed in coverage of the macro cell and comprising a center base station and peripheral base stations; and
  a controller configured to manage traffic of the small cell base station group, to control an operation of at least one of the peripheral base stations based on the traffic of the small cell base station group, to extend coverage of the center base station to be as large as coverage of the small cell base station group, in response to the traffic decreasing with time and the traffic being less than a first reference value, and to deactivate the peripheral base station.

7. The base station managing system of claim 6, wherein the controller is further configured to activate all of the peripheral base stations, in response to the traffic increasing with time and the traffic being greater than or equal to a second reference value.

8. The base station managing system of claim 7, wherein the controller is further configured to verify a number of terminals accessing an activated peripheral base station among the peripheral base stations, and to deactivate a peripheral base station among the peripheral base stations which is not accessed by a terminal at a unit time interval.

9. The base station managing system of claim 6, wherein the controller is further configured to select the small cell base station group to manage an area where massive traffic occurs, in response to traffic of the macro base station increasing and the traffic of the macro base station being greater than or equal to a second reference value, and to activate peripheral base stations among the selected small cell base station group.

10. The base station managing system of claim 6, wherein the controller is further configured to manage whether the traffic increases or decreases by measuring the traffic at a time interval.

11. The base station managing system of claim 6, wherein the macro base station and the center base station are configured to maintain an activation state.

12. The base station managing system of claim 6, wherein terminals accessing the macro base station are configured to periodically transmit to the controller reference signal information received from the peripheral base stations, and the controller is further configured to select a small cell group capable of managing a position where the traffic increases based on the received reference signal and a traffic state for each small cell group.

13. The base station managing system of claim 6, wherein the macro base station and the small cell base station group are connected with the controller by an optical cable.

\* \* \* \* \*